United States Patent

[11] 3,615,827

[72] Inventor Donald P. Murphy
 Roseville, Mich.
[21] Appl. No. 806,034
[22] Filed Mar. 5, 1969
[45] Patented Oct. 26, 1971
[73] Assignee Hooker Chemical Corporation
 Niagara Falls, N.Y.
 Continuation of application Ser. No.
 459,903, May 28, 1965, now abandoned.

[54] PAINT-STRIPPING COMPOSITION AND METHOD
 10 Claims, No Drawings
[52] U.S. Cl. .................................................. 134/38,
 252/127, 252/158
[51] Int. Cl. .................................................. B08b 7/00,
 C23g 1/14
[50] Field of Search ........................................... 134/38;
 252/127, 158, DIG. 8

[56] References Cited
 UNITED STATES PATENTS

| | | | |
|---|---|---|---|
| 2,443,173 | 6/1948 | Baum et al. .................. | 252/127 |
| 2,710,843 | 6/1955 | Stebleton .................... | 134/38 X |
| 2,897,104 | 7/1959 | Duncan ....................... | 252/158 X |
| 2,898,246 | 8/1959 | Hannah ....................... | 134/38 |
| 2,929,789 | 3/1960 | Pick ............................. | 252/DIG. 8 |
| 2,971,919 | 2/1961 | Goldsmith ................... | 252/DIG. 8 |
| 3,048,547 | 8/1962 | Vosbigian .................... | 134/38 UX |
| 3,308,066 | 3/1967 | Murphy et al. .............. | 252/158 |

Primary Examiner—Morris O. Wolk
Assistant Examiner—Joseph T. Zatarga
Attorneys—Stanley H. Lieberstein and William J. Schramm ABSTRACT: A paint-stripping composition comprising an alkali metal hydroxide and an accelerator composition of a polyalkylene glycol and ethylene glycol monophenyl ether. Preferably, the activator composition is made up of tripropylene glycol and ethylene glycol monophenyl ether.

PAINT-STRIPPING COMPOSITION AND METHOD

This application is a continuation of application Ser. No. 459,903, filed May 28, 1965, now abandoned.

This invention relates to a composition and method for removing protective coatings from surfaces and more particularly it relates to a novel additive for increasing the effectiveness of alkaline stripping compositions.

In the manufacture of various commercial articles, it is often the practice to provide such articles with a protective and/or decorative coating on the surface. The coatings applied include paints, varnishes, lacquers and the like, and are formulated from numerous and diverse components, including acrylic resins, epoxy resins, vinyl resins, alkyd resins, and the like.

In the course of manufacturing these commercial articles, it sometimes happens that some of the articles fail to meet the manufacturing specification because of some defect in the protective and/or decorative coatings which are applied. When this happens, it is desirable to remove the defective coating, e.g., paint, from the article so that it may be recoated rather than discarded or sold as a "second," with the resulting financial loss. In recent years, however, great improvements have been made in both the durability and adhesion of paints and similar protective coatings so that their removal from a surface after they have been applied, cured and/or dried, has become increasingly difficult. These difficulties have been encountered particularly when using chemical means to effect the removal of the coatings, such chemical removal methods generally being preferred because they tend to limit costly hand operations and are more readily adapted to a continuous process.

Not only is it desirable to remove the paint on articles from which the coating is defective, but, additionally, where the articles being coated are transported on a conveyor line, the hooks which support the article also become coated with the paint or similar coating during the process. Since these hooks or hangers are repeatedly introduced into the painting zone of the process, the paint continues to build up on them adding weight to the conveyor line and often filling in the hook, if it is not periodically stripped off or removed. Accordingly, it is desirable to remove such protective coatings from these hooks or hangers, as well as from defective articles, quickly and completely, and preferably by using chemical means.

I the past, considerable use has been made of alkaline stripping compositions in which the article from which the protective coating is to be removed is immersed for a period of time sufficient to effect a substantial loosening of the coating. With the advent of improved paint systems, such as the acrylic paints and lacquers, difficulties have often been encountered with such alkaline stripping compositions. Frequently, it has been found that the articles must be immersed in a boiling alkaline stripping composition for several hours in order to obtain the desired loosening of the protective coating. In some instances, even longer contact times have not resulted in an appreciable loosening of the coating.

It is, therefore, an object of the present invention to provide an improved alkaline stripping composition which is effective in removing various protective coatings, such as paint and the like, from surfaces to which they have been applied.

Another object of the present invention is to provide an improved alkaline stripping composition which is particularly effective in removing acrylic type coating material in appreciably shorter periods of time than has heretofore been possible with alkaline stripping compositions.

A further object of the present invention is to provide an improved method for removing protective and/or decorative coatings from surfaces to which they have been applied, which method is carried out in an appreciably shorter period of time than has heretofore been possible.

These and other objects will become apparent to those skilled in the art from the description of the invention which follows.

Pursuant to the above objects, the present invention includes an alkaline composition useful in removing protective films, which comprises an alkali metal hydroxide as the principal source of alkalinity and accelerating amount of an accelerator composition comprising a polyalkylene glycol and an alkylene glycol aryl ether. Broadly, the present composition includes both an aqueous solution useful as an aqueous paint stripping material and an alkaline concentrate, which may or may not contain water, which may be diluted with water to form the aqueous stripping solution of the desired concentration. The present invention also includes an alkaline composition adapted for use as a stripping composition when dissolved in water, which comprises a major proportion of an alkali metal hydroxide, as the principal source of alkalinity, and an accelerating amount of an accelerator composition comprised of a major proportion of a polyalkylene glycol and an alkylene glycol aryl ether. Such compositions, when dispersed in water, are found to give excellent results in removing or substantially loosening decorative and/or protective films, such as paints and the like, from metal surfaces to which they have been applied. These compositions have been found to be particularly effective in removing coating materials containing acrylic, epoxy, vinyl, or alkyd resin coating components, which coating materials have heretofore been removed, if at all, only with great difficulty when using conventional alkaline paint strippers.

More specifically, the alkaline composition of the present invention contains an alkali metal hydroxide, as the principal source of alkalinity, in an amount of at least about 50 percent by weight of the composition. Desirably, in this solid composition, the alkali metal hydroxide is present in an amount within the range of about 70 percent to about 97 percent by weight of the composition.

In addition to the alkali metal hydroxide, the solid alkaline compositions which are dispersible in water to form the present paint stripping solution may also contain other alkaline materials, if desired. Such alkaline materials may include the alkali metal carbonates, alkali metal silicates, alkali metal phosphates, and the like. Exemplary of the alkali metal phosphates which may be used in the composition are trisodium phosphate, tetrasodium pyrophosphate, tetrapotassium pyrophosphate, sodium tripolyphosphate, and the like, Typically, these latter alkaline material, i.e., the alkali metal silicates, carbonates and phosphates, will be present in the alkaline composition, when used, in amounts up to about 50 percent by weight of the composition, with amounts within the range of about 3 percent to about 30 percent by weight of the composition being preferred. It is to be understood that the foregoing amounts refer to the total of all alkaline material other than the alkali metal hydroxides, which totals may be made up of only one of the added alkaline materials or of a mixture of two or more of these materials.

It is to be appreciated, of course, that as used in the specification and claims, the term "alkali metal" is intended to refer to lithium, sodium, potassium, cesium, and rubidium. In many instances, the preferred alkali metal has been found to be sodium so that primary reference hereinafter will be made to the compounds of sodium, This is not, however, to be taken as a limitation of the present invention but merely as being exemplary thereof, since potassium hydroxide and alkaline potassium salts are also useful.

In addition to the alkaline materials indicated hereinabove, the solid alkaline compositions of the present invention may also include a gluconic acid material. Such material is typically present in the composition in an amount up to about 10 percent by weight of the composition, with amounts within the range of about 2 percent to about 7 percent by weight of the composition being preferred. It is to be understood that by the term "gluconic acid material" it is intended to refer to and include gluconic acid itself, water-soluble and/or water-dispersible forms of gluconic acid such as the alkali metal gluconates, and in particular sodium gluconate, glucono-delta-lactone, and the like.

Surface active or wetting agents may also be included in the subject composition, typically in amounts up to about 10 percent by weight of the total composition with amounts within the range of about 1.0 percent to about 7 percent by weight of the composition being preferred. Various suitable surface-active agents of the anionic, nonionic and cationic types may be used, provided they are soluble and effective in solutions having a high alkalinity. In many instances, excellent results have been obtained when using wetting or surface-active agents of the phosphate ester type and, accordingly, these materials are preferred. Materials of this type are exemplified by QS-44, a product of the Rohm and Haas Company. Additionally, sulfated fatty acid derivatives and sulfonated fatty acid amide derivatives as described in U.S. Pat. Nos. 2,773,068 and 2,528,378, may be used. Exemplary of these materials are Miranol C$_2$M and Miranol C$_2$M products of the Miranol Chemical Company.

As has been indicated hereinabove, the activating composition, comprised of a polyalkylene glycol and an alkylene glycol aryl ether, is present in the stripping composition in an activating amount. If desired, the activating composition may be included in the solid alkaline composition or it may be added to the aqueous paint stripping composition which is formulated by dispersing or dissolving the alkaline composition in water. In some instances, it may be preferable to have a slight excess of the activator to insure complete saturation of the alkaline solution. The excess will form a oil slick on the surface of the solution. This slick may be used as a guide in making additions of the activating material. When the slick disappears, this is an indication of depletion of the activator and an addition of the activating material is needed. Typically, when the activating composition is included in the solid alkaline composition, it is present in an amount within the range of from about 1 percent to about 10 by weight the total composition, with amounts within the range of about 2 percent to about 8 percent being preferred. Where the activating composition is added to the aqueous alkaline paint stripping solution, it is typically present in an amount within the range of about 1 percent to about 12 percent by volume of the paint-stripping solution, with amounts within the range of about 2 percent to about 7 percent by volume being preferred.

The accelerator composition is comprised of at least about 50 percent by weight of a polyalkylene glycol and a lesser amount of an alkylene glycol aryl ether. Desirably, the weight ratio of the glycol to the glycol ether in the accelerating composition is within the range of 1-3:1 and preferably about 2:1 although in some instances both greater and lesser ratios may be used. The glycol ethers used are of the type

RO(R'O)$_n$X wherein R' is an alkylene radical, R is monocyclic aryl, n has an average value of at least 1 and X is monocyclic aryl or hydrogen. Preferably, these ethers contain a total of at least seven carbon atoms and the alkylene radical preferably contains from about two to about six carbon atoms. The glycols used are of the type

HO(RO)$_n$H wherein R is an alkylene radical and n has an average value of at least 2. Preferably, n is a number from about 2 to about 5 and the alkylene radical preferably contains from about two to about six carbon atoms. Various polyalkylene glycols can be used in the present accelerating compositions including diethylene glycol, triethylene glycol, dipropylene glycol, tripropylene glycol, tetraethylene glycol, dibutylene glycol, and the like. Of these, the preferred is tripropylene glycol and primary reference will be made hereinafter to this material. Various alkylene glycol aryl ethers can be used in the accelerating composition of the present invention, including ethylene glycol monophenyl ether, propylene glycol monophenyl ether, butylene glycol monophenyl ether, diethylene glycol monophenyl ether, dipropylene glycol monophenyl ether, and the like. Of these, the preferred is the ethylene glycol monophenyl ether, and for this reason hereinafter primary reference will be made to this material. A preferred accelerating composition for use as an accelerating additive in the alkaline stripping solutions of the present invention is one made up of tripropylene glycol and ethylene glycol monophenyl ether, in a weight ratio of about 2:1. It is to be appreciated that in some instances the accelerating composition may also contain a part or all of the adjuvants set forth hereinabove as being included in the alkaline composition. For example, surface active agents, gluconic acid materials ans even the alkaline materials, other than the hydroxide, may be incorporated into the accelerator composition. Where this is done, of course, correspondingly lesser quantities of these adjuvants will be included in the solid alkaline composition.

In formulating the aqueous alkaline paint stripping compositions of the present invention, the solid alkaline compositions, described above, are dissolved in water in amounts sufficient to provide the desired alkalinity to effect substantial loosening of the paint film to which the composition is applied, but in amounts insufficient to exceed the maximum solubility of the accelerator composition in the solution. In this regard, it has been found that the solubility of the accelerator composition, and in particular the tripropylene glycol component of the composition is inversely proportional to the alkalinity of the stripping solution, so that at lower alkalinities, more of the accelerator composition can be dissolved in the stripping solution. Typically, the aqueous alkaline paint-stripping solutions of the present invention will contain the solid alkaline composition in amounts within the range of about 0.5 pounds to about 5 pounds per gallon of solution, with amounts within the range of about 1 pound to about 3 pounds per gallon being preferred. Where the additive composition has not been included in the solid alkaline composition from which the aqueous stripping solution has been made, it will, of course, be added to the stripping solution in amounts as have been indicated hereinabove, In its most preferred embodiment, the aqueous alkaline paint stripping solution contains the solid alkaline composition in an amount of about 2 pounds per gallon and the additive composition in an amount of about 3 percent by volume of the stripping solution.

In utilizing the stripping compositions of the present invention, the aqueous alkaline stripping solution, formulated as has been indicated hereinabove, is brought into contact with the article from which it is desired to remove paint or a similar protective or decorative coating. The contact time needed to effect a substantial loosening of the paint from the surface will depend on the nature and thickness of the paint which is to be removed. With some paint, contact times of a few minutes, e.g., 2 to 3 minutes, may be sufficient while with other and more difficulty removable paints, appreciably longer contact times, e.g., 30 minutes or more, may be desirable. Accordingly, it is not feasible to give specific contact times because the times of contact used will, in each instance, be those which will effect a substantial loosening of the paint on the surface.

In this regard it is to be noted that it is not essential that the stripping composition of the present invention remain in contact with the coated surface for a period of time sufficient to effect complete removal of the coating from the surface. It is only necessary that the contact time be sufficient to effect a loosening of the paint film on the surface so that it may be removed by brushing, high-pressure water sprays, or the like. Generally, it is desirable that the contact between the stripping composition and the surface from which the coating is to be removed is effected by immersing the surface in the stripping solution. In this manner, a thorough and continuous wetting of the surface film by the stripping solution is obtained, with little or no loss of the stripping solution. In some instances, however, particularly when less difficulty removable films are to be treated which normally require only short contact times, other contacting techniques such as spraying, flooding, or the like, may be utilized.

Desirably, the paint-stripping solution is at an elevated temperature when it is brought into contact with the surfaces from which the protective film is to be removed. Preferably, the solution is at a temperature which is close to its boiling point, with temperatures within the range of about 90° to about 100° C. being typical. It will be appreciated, however, that in some instances either higher or lower temperatures, e.g., room temperature, may also be used.

After the protective film on the surfaces treated has been substantially loosened by contact with the stripping solution, and the film has been removed from the surface, either by retaining the surface in the stripping solution until removal is complete or by utilizing other techniques on the loosely adhering film, the surface is in condition to be recoated with a new protective film. Generally, it is preferred that the surface be water rinsed so as to remove any of the alkaline stripping solution which may be retained on the surface prior to again subjecting the surface to the coating operation. It has been found that by using the aqueous alkaline stripping solutions described above, in the manner which has been indicated, greatly improved results are obtained in terms of reduction in the time required to effect a substantial loosening of many different types of protective film, such as paints, lacquers, varnishes, and the like.

In order that those skilled in the art may better understand the present invention and the manner in which it may be practiced, the following examples are given. It is to be understood, however, that these examples are only exemplary of the compositions and processes of the present invention and are not to be taken as limiting the invention. In these examples, unless otherwise indicated, temperatures are in degrees centigrade and parts and percents are by weight.

In the following examples, the paints to be removed were applied to 1-inch by 4-inch steel panels which had previously been coated with a convention zinc phosphate paint base coating. Unless otherwise indicated, the thickness of the paint on the panels was about 1 mil (1/1000 inch). The painted panels were then immersed in the various stripping solutions to be tested and retained therein until there was a substantially complete removal of the paint film from the panel. The stripping solutions were maintained at about 100° C. during the time the panels were immersed therein. In formulating the stripping solution, a solid alkaline composition have the following components in the amounts indicated was used:

| | |
|---|---|
| Sodium hydroxide | 93 percent |
| Sodium gluconate | 5.5 percent |
| Kerosene | 0.5 percent |
| Anionic phosphate wetting agent | 1.0 percent |

Two pounds of this material were dissolved in water and to the resulting aqueous solution, there was added one of the following accelerator compositions in an amount of 3 percent by volume of the aqueous solutions:

Composition A

| | |
|---|---|
| Triproplylene glycol | 72 percent |
| Monethanolamine | 2 percent |
| Gluconic acid (50 percent aqueous solution) | 5 percent |
| Water | 21 percent |

B

| | |
|---|---|
| Ethyleneglycolmonophenyl ether | 100 percent |

Composition C

| | |
|---|---|
| Tripropyleneglycol | 66 percent |
| Ethyleneglycolmonophenyl ether | 27 percent |
| Sodium ethylhexylsulfate (anionic surface active agent) | 3 percent |
| Water | 4 percent |

Using the 180 as has been set forth hereinabove, the following results were obtained:

| Example | Accelerator Composition Used | Paint System | Time For Complete Removal In Minutes |
|---|---|---|---|
| 1 | A | Acrylic (2 mils thick) | 24 |
| 2 | C | Acrylic (2 mils thick) | 18.5 |
| 3 | A | Acrylic | 17 |
| 4 | | Acrylic | 11.5 |
| 5 | A | Acrylic | 42 |
| 6 | B | Acrylic | 19.5 |
| 7 | C | the Acrylic | 16.5 |
| 8 | A | Acrylic primer | 9 |
| 9 | B | Acrylic primer | 7.5 |
| 10 | C | Acrylic primer | 5 |
| 11 | A | White Vinyl | 11 |
| 12 | C | White Vinyl | 5 |
| 13 | A | Epoxy primer and melamine baked enamel | 15 |
| 14 | B | Epoxy primer and melamine baked enamel | 20 |
| 15 | C | Epoxy primer and melamine baked enamel | 7.5 |
| 16 | A | Epoxy primer and acrylic lacquer | 16 |
| 17 | B | Epoxy primer and acrylic lacquer | 16 |
| 18 | C | Epoxy primer and acrylic lacquer | 8 |

The procedure of the preceding examples is repeated using solutions formulated from alkali metal compounds other than sodium compounds, including potassium hydroxide, potassium carbonate, and the like; using other polyalkylene glycols, including diethylene glycol, triethylene glycol, dipropylene glycol, dibutylene glycol, tetraethylene glycol, and the like; and using other alkylene glycol aryl ethers, including propylene glycol monophenyl ether, diethylene glycol monophenyl ether, butylene glycol monophenyl ether, dipropylene glycol monophenyl ether, and the like, to obtain similar results.

From these results, it is seen that the use of the activator containing both the glycol and the glycol ether gives greatly improved stripping results over the use of either one of these components alone as the activator.

While there have been described various embodiments of the invention, the compositions and methods described are not intended to be understood as limiting the scope of the invention as changes therein are possible and it is intended that each element recited in any of the following claims is to be understood as to be referring to all equivalent elements for accomplishing substantially the same results in substantially the same or equivalent manner, it being intended to cover the invention broadly in whatever form its principles may be utilized.

I claim:

1. An alkaline composition useful in removing protective films which comprises from about 50 to 97 percent by weight of an alkali metal hydroxide and from about 1 to 10 percent by weight of an accelerator composition which comprises a polyalkylene glycol and ethylene glycol monophenyl ether in a weight ratio of from about 1–3:1.

2. The composition as claimed in claim 1 wherein the polyalkylene glycol is tripropylene glycol and the weight ratio of polyalkylene glycol to ethylene glycol monophenyl ether is 2:1.

3. An aqueous paint removing composition which comprises an alkali metal hydroxide in an amount within the range of about 0.5 pounds to about 5.0 pounds per gallon and an accelerator composition in an amount within the range of about 1 to about 12 percent by volume of the composition, the accelerator composition comprising a polyalkylene glycol and ethylene glycol monophenyl ether in a weight ration of about 1–3:1.

4. An aqueous paint removing composition which comprises an alkaline composition in an amount within the range of about 0.5 to 5.0 pounds per gallon and an accelerator composition in an amount within the range of about 1 to 12 percent by volume of the aqueous composition, said alkaline composition being comprised of from about 50 to 97 percent by weight of an alkali metal hydroxide and from about 3 to 50 percent by weight of an additional alkaline material selected from the group consisting of alkali metal silicates, alkali metal carbonates, and alkali metal phosphates and the accelerator composition being comprised of a polyalkylene glycol and ethylene glycol monophenyl ether in a weight ratio of from about 1–3:1.

5. The aqueous paint removing composition as claimed in claim 4 wherein the polyalkylene glycol is tripropylene glycol and the weight ratio of polyalkylene glycol to ethylene glycol monophenyl ether is 2:1.

6. The aqueous paint stripping composition as claimed in claim 5 wherein the alkaline composition is present in an amount within the range of about 1 pound to 3 pounds per gallon and the accelerator composition is present in an amount within the range of about 2 to 7 percent by volume of the total solution.

7. A method of removing paint and similar protective films from the surface of an article which comprises contacting the surface from which the film is to be removed with the aqueous alkaline paint-stripping composition as claimed in claim 3 and maintaining the composition in contact with the surface for a period of time sufficient to effect substantial loosening of the film on the surface.

8. A method of removing paint and similar protective films from the surface of an article which comprises contacting the surface from which the film is to be removed with the aqueous alkaline paint-stripping composition as claimed in claim 4 and maintaining the composition in contact with the surface for a period sufficient to effect a substantial loosening of the film on the surface.

9. A method of removing paint and similar protective films from the surface of an article which comprises contacting the surface from which the film is to be removed with the aqueous alkaline paint-stripping composition as claimed in claim 5 and maintaining the composition in contact with the surface for a period sufficient to effect a substantial loosening of the film on the surface.

10. A method of removing paint and similar protective films from the surface of an article which comprises contacting the surface from which the film is to be removed with the aqueous alkaline paint-stripping composition as claimed in claim 6 and maintaining the composition in contact with the surface for a period sufficient to effect a substantial loosening of the film on the surface.

* * * * *